US005528453A

United States Patent [19]
Berman et al.

[11] Patent Number: 5,528,453
[45] Date of Patent: *Jun. 18, 1996

[54] VIDEO RECORDING TRAVELING CART

[75] Inventors: Jessica R. Berman, North Miami Beach; Steve M. Kirkland, Dania, both of Fla.

[73] Assignee: Video Express Systems, Inc., N. Miami Beach, Fla.

[ * ] Notice: The term of this patent shall not extend beyond the expiration date of Pat. No. 5,513,066.

[21] Appl. No.: 415,190

[22] Filed: Apr. 3, 1996

Related U.S. Application Data

[63] Continuation-in-part of Ser. No. 286,518, Aug. 5, 1994.
[51] Int. Cl.⁶ .................................................. H02B 1/08
[52] U.S. Cl. .................. 361/625; 280/47.26; 312/249.8; 348/838; 354/81; 361/827
[58] Field of Search ...................... 354/81, 293; 307/150; 280/33.995, 33.997, 47.371, 47.2, 47.26, 47.33; 222/25, 26, 30; 206/328, 332; 221/2, 92; 220/908, 909, 485; 248/129, 130, 135, 136, 316.7, 455; 312/114, 117, 249.8, 249.11, 7.1, 7.2, 213, 236, 311; 348/376, 838; 358/296, 302, 312, 471, 479, 906, 909.1; 361/600–602, 622, 625, 641, 658, 679, 724–726, 728, 807, 809, 810, 829, 826, 827

[56] References Cited

U.S. PATENT DOCUMENTS

| | | | |
|---|---|---|---|
| 1,099,933 | 6/1914 | Pohrer. | |
| 4,719,513 | 1/1988 | Peterson | 358/254 |
| 4,755,881 | 7/1988 | Bartlett | 358/254 |
| 4,828,340 | 5/1989 | Jorgensen | 312/7.1 |
| 4,922,721 | 5/1990 | Robertson | 62/3.61 |
| 5,091,791 | 2/1992 | Mitchell | 358/479 |
| 5,261,824 | 11/1993 | Ness | 434/365 |

*Primary Examiner*—Gerald P. Tolin
*Attorney, Agent, or Firm*—Malin, Haley, DiMaggio & Crosby

[57] ABSTRACT

A recording equipment travel cart for easily transporting video recording equipment used in video depositions, wherein the cart generally comprises three compartments, wherein one compartment is detachable from the main compartment, while another compartment is hingedly attached to the main compartment, and casters are provided for easily rolling and transporting the cart. In addition, the recording equipment travel cart includes foam cushion lining on the interior section to protect the equipment and cabling to make the required connections with the equipment.

19 Claims, 12 Drawing Sheets

VIDEO RECORDING TRAVELING CART

This application is a continuation-in-part of application Ser. No. 08/286,518, filed Aug. 5, 1994.

BACKGROUND OF THE INVENTION

1. Field of the Invention

This invention relates generally to a recording equipment travel cart for the convenient transportation and setup of equipment used in audio and video recording, and more particularly, to a compact travel cart that conveniently and safely transports rack-mounted video deposition equipment such as camcorders, cassette players, audio mixers, monitors, cables, and microphones to recording sites and reduces the time needed to setting up and breaking down the equipment.

2. Description of the Prior Art

Video and audio taping of noteworthy events, such as, trials, depositions, political gatherings, interviews, weddings, and other family related events, has become increasingly popular as technical advances have been made in compact state of the art recording equipment. The legal community, especially, has increased their use of video and audio recording equipment in covering legal depositions and witness interviews to preserve and enhance testimony in the event a witness becomes unavailable for trial, unwilling to testify or untrustworthy so as to require impeachment.

Despite the vast technological improvements in recording equipment, transporting, setting up and breaking down the components remains complicated, inconvenient, and time consuming. The equipment typically interfaced in video recorded depositions includes a power strip, camcorders, cassette players, audio mixers, LCD monitors and microphones. To make the necessary connections between this equipment usually requires approximately several hundred feet of cable, which, of course, ends up appearing "spaghetti-like", confusing and hazardous.

On the average, it takes from thirty minutes to one hour to unload, transport, and set up the equipment and often necessitates the assistance of support technicians. These same connections are typically repeated several times a day and require that, personnel race between jobs to afford ample time to prepare for recording, to maximize the available hours in a day and to be prompt for scheduled appointments, trials, and depositions. Consequently, components get damaged while loading, transporting and carrying the equipment. Therefore, not only is money lost in the time spent preparing the equipment to record and in hiring technicians, but it also becomes expensive to replace and repair damaged components. Accordingly, a recording equipment travel cart that houses components in a way that reduces the requisite number of cable connections, protects the components from damage, organizes the cables, makes transporting easier and abrogates the need for trained technician assistance would be well received.

Although there exist several video systems which include travel carts or cabinets, none of the systems noted in the background art addresses nor solves the problems noted by the instant invention. Jorgensen, U.S. Pat. No. 4,828,340, discloses an audio/video electronic component cabinet that has a chimney formed along its back wall between the shelves to exhaust and vent hot air from the components in an attempt to keep the equipment cool. Although the Jorgensen cabinet stores electronic components, it is not designed for convenient travel and setup. Rather, it is a stationary unit for use in a single location. Bartlett, U.S. Pat. No. 4,755,881, discloses a transportable video apparatus for use outdoors, which includes a cart for protecting the components of the video system from rain, snow, or other environmental conditions. The Bartlett apparatus comprises a single cabinet having a front door, wheels, foldable handle, a video monitor, a video tube, and a hood. The cart provides weatherproof protection to the system components and provides a video tube and hood for blocking out sunlight so that the video monitor may be viewed in bright sunlight without substantial loss of the viewed image. Bartlett concentrates on making outdoor video viewing more practical, but does not provide a cart that is easily transportable, protects components during transportation, organizes hundreds of feet of cable and alleviates complications associated with connecting components. Likewise, Petersen, in U.S. Pat. No. 4,719,513, discloses a compact video system comprising a two-tier collapsible cart that houses video system components for use outdoors. The Petersen video system comprises a lower housing supporting an upper housing by adjustable and collapsible arms, whereby the upper compartment is pivotally mounted on the lower housing. When the upper housing is collapsed against the lower housing, a brake is actuated to lock the wheels to prevent easy removal of the cart and theft of components housed in the lower housing. The video system also includes a video monitor and lid which covers the monitor when closed. Again, Peterson fails to address the problems associated with interfacing modern recording components, organizing and connecting complex arrays of cable, transporting numerous pieces of equipment and protecting expensive components from damage.

In contrast with the present invention, none of the foregoing devices envisions a travel cart convenient for safely storing and transporting expensive, modern video components in an efficient manner so as to reduce the likelihood of damage and the time necessary for setting up the video system for recording legal depositions, witness interviews, trials, and other events. Therefore, there remains a need for a cart that is capable of housing expensive video components in a compact, preconnected manner that alleviates the inconvenience associated with making video and audio component connections, running lengthy cables, and transporting numerous pieces of expensive video equipment, and which provides a compact cart that protects the components against damage. The instant invention resolves the above-noted problems by providing a detachable three-compartment cart having a retractable handle, lockable wheels, protective shell housing, securing straps, interior foam cushion, rack-mounting hardware for prearranging and connecting components, and retractable cable-spools all contained in one travel cart for easy setup, breakdown, storage, and transportation between locations.

SUMMARY OF THE INVENTION

In light of the above-noted, it is an object of the instant invention to provide a recording equipment travel cart that allows video and audio components to be prearranged and electrically connected once in one convenient cart so that the entire unit and all the components may be easily transported and used at different locations without having to connect and disconnect all the components and cables at each taping.

It is another object of the instant invention to provide a recording equipment travel cart that completely houses all the components necessary for video and audio recording in one convenient cart for transporting.

It is a further object of the instant invention to provide a recording equipment travel cart that houses video and audio components in a prearranged and preconnected manner so as to significantly reduce the time required for setting up and breaking down the components.

It is also an object of the instant invention to provide a recording equipment travel cart that is easier to load and unload from vehicles, requires minimal storage space and is easier to move from the vehicle to the recording location.

It is yet another object of the instant invention to provide a recording equipment travel cart that insulates the video and audio components from damage usually caused by the impact of foreign objects, dropping, or shifting in a vehicle while driving.

It is still another object of the instant invention to provide a video and audio component travel cabinet that condenses and organizes several hundred feet of cable into one cart so as to eliminate entangled cable arrays.

These and other objects are achieved by the instant invention which contemplates a recording equipment travel cart, typically used in making video and audio recordings of depositions, trials, interviews, and other events, comprising a lightweight, durable travel case having individual but interrelated compartments, wheels, a retractable handle, foam cushion lining the interior of the compartments, automatic cable reeling devices or spools for releasably extending and retracting cables, and equipment racks for securing all the necessary equipment utilized in video and audio depositions. The travel cart allows recording components to be arranged and connected once for repeated use in a compartmentalized trunk-style case fabricated from a lightweight ABS plastic, weighing approximately 40 pounds and having three individual compartments; a front bay, a middle or main bay, and a rear bay. The weight may fluctuate without departing from the scope and spirit of the instant invention. The front bay is primarily used for securely containing the camcorder and is completely removable from the main bay. The main bay typically stores the recording control equipment. Finally, the rear bay generally houses the required cables used in interfacing the control equipment with power, microphones and the video camera.

The instant invention comprises the actual case with its three compartments, the insulated lining, the rack-mounted brackets, the retractable handle, the wheels and the automatic cable reels. Thus, the invention does not necessarily include the equipment, but is manufactured and assembled so as to adapt to the installation of any type of equipment necessary for one's particular needs in making video and audio recordings. However, the invention may also include all or some of the equipment required for taking a video deposition, rack-mounted in the cart in two separate compartments, with the third or rear bay compartment housing the required cables for making the necessary connections.

The rack-mounted audio and video components that may normally be found or installed into the main bay includes a front-loading cassette player, a 267 four-channel audio mixer, and a Sony LCD monitor mounted on the retractable support arm and pivot arm as noted above. It should be noted, however, that any of this equipment is optional and may be substituted with other components as dictated by the user or similar components manufactured and marketed by different companies.

The first compartment, or front bay, generally houses and protects a camcorder, such as the Panasonic AG-455U camcorder. The front bay reveals a removable cushioned cover in its open end when it is removed from the main bay, and is held in place by at least one hook and loop strap. The camcorder is protected by a custom foam cushion lining cut to fit snugly around the camera so as to prevent movement during transportation and by foam cushion lining the interior side of the cover.

The middle or main bay provides a compartment with mounting hardware for rack-mounting the majority of the components necessary for video and audio taping. The interior volume of the main bay provides shelves and rack-mounting brackets along the interior side walls and extending between the side walls. These brackets and shelves may be stainless steel, aluminum, or a plastic-like material. The shelves are functionally spaced apart for supporting and securing the majority of the equipment used, such as a cassette player, an audio mixer, and a video monitor. The equipment rests on the shelves provided in the main bay while extension brackets may join the rack-mounting brackets, at one end, to the equipment at the other end for tightly securing the equipment in place. Equipment may also be secured by hook and loop strips attached to the brackets, shelves, and equipment at corresponding positions. This prevents the equipment from moving and being susceptible to damage during transportation. In addition, a front cover having a cushion lining on its inner surface is installed at the open front end of the main bay to seal off the components from view and protects them from damage. Hook and loop securing straps hold the protection cover in place. The protection cover is similar to the one used on the open rear end of the front bay for protecting the camcorder. Both covers are used to protect the respective equipment contained within their volumes when the front bay is attached to the main bay. The covers are hard plastic on their exterior surfaces and include a foam cushioned insulating lining on their interior surface for protecting components contained inside the compartments.

In the preferred embodiment, the main bay is adapted for housing a video monitor and therefore includes a pivot arm joined to a retractable or slidable support arm for connecting and supporting the video monitor both inside and outside the main bay. The video monitor may be provided in the instant invention for mounting on one end of the pivot arm to enable tilting in any direction. The opposite end of the pivot arm is attached to one end of the slidable support arm which has an elongated groove to allow for sliding and supporting the video monitor outside the main compartment.

The third or rear bay provides housing for all the cables necessary in connecting and operating the equipment contained in the main bay and for providing power to the unit. The rear bay generally houses the automatic cable reels which may comprise three spring-loaded retractable cable reels or spools, which provide lockable adjustment of the cable lengths when the cables are extended and retracted. When the cables are extended from the reels, they may be locked in place when the desired length is achieved, or automatically retracted into the reel by releasing the cables from their locked position thereby allowing them to be pulled back by the tension originally created in the reels during extension of the cables. The first reel may contain up to 40 feet of cable or any reasonable length of cable necessary for servicing a plurality of microphones. A second reel may be used to house a plurality of cables for connecting to the individual camera ports or feeds. Finally, the third reel may house the AC power cord. Typically, the camera cable spool contains approximately five separate cables for connecting to the camera while the third spool houses a 25–50 foot long power cord. As noted, the camera cables may be combined into a single ribbon cable with a single plug for plugging into the camera. These figures, however, are optional and may be adjusted according to a user's requirements.

In an alternative embodiment, the automatic cable reels may comprise a video camera cable housing, a power cord reel and an electrical microphone cable reel. The video camera cable housing provides an enclosure for housing a ribbon cable that provides the necessary video camera connections in one integrated cable ending with a plug adapter for connecting to a corresponding camera adapter. The power cord reel is as discussed above. The electrical microphone cable reel provides an automatic electric reeling device having a plurality of electrically controlled and rotated spools for extending and retracting the microphones and microphone cables in an efficient manner. In addition, the microphones are more accessible in the alternative embodiment since they come out the front of the main bay.

The cables contained in each of the three reels of the preferred embodiment extend from the spools in two different directions. In one direction, the cables extend outside the cart for setting up the microphones, for making connections to the camcorder and for tapping into a power outlet. In the other direction they extend from preferably the middle of the spools and make connections to the various components contained inside the main bay. That is, the cables are spliced with electrical adapters for connecting to their respective equipment adapters.

In the alternative, a separation panel may be firmly attached to the back side of the main bay for protecting the components and for concealing the cables from view at the front of the main bay. Although the equipment typically comes fitted with the required adapters, the panel may also be used for supporting quick-connect connectors or adapters for mating with the corresponding plugs on the cables. In this arrangement the equipment could be hardwired through the back of the connection panel to the adapters. In addition, the cables may be fitted with special plugs that have only one corresponding adapter mounted on the panel, i.e. one for each cable, so as to prevent an inadvertent wrong connection. Thus, as far as the user is concerned, the corresponding cables merely need to be plugged into their respective adapters, located on either the separation panel or the components themselves. In either event, the overall effect of the instant invention is to eliminate set up time by providing easy connections in one cart. With the prearranged equipment and adapters, setup time has been known to be reduced from 30–60 minutes down to approximately five minutes. This represents valuable time saved yielding increased profit potential.

The AC power cord reel is located in the rear bay, normally on the side opposite the component cable reels which extend the microphones and connect to the video camera. The microphones may comprise individual components. However, since modern microphones are relatively small they may be permanently connected to their respective cables so that they substantially retract into the microphone cable spool for convenience. In the alternative embodiment, the microphones and cables are provided in an electrical microphone cable reel component which electrically extends and retracts the microphone. This alternative prevents entanglement and allows the microphone to be easily placed at four corners of a room. Meanwhile, the power cord may electrically connect to a surge protector with a plurality of outlets for the components or it may connect to a power strip to which the components could be hardwired.

The rear bay is preferably hinged on one side to the main bay typically by a piano hinge. On the opposite side, releasable buckle fasteners may be used to releasably join the opposite side of the rear bay to its corresponding side of the main body. The hinge allows the rear bay to be swung open away from the main bay to allow the necessary component connections to be made. The front lid is releasably attached to the front side of the main bay and may be completely removed so that the video cart is reduced to two parts that easily fit into the trunk of a car. Accordingly, the three bay cart continues to house the components when not in use providing a protective outer shell and inner shock absorbing cushion, and allows the cart to be divided into just two components for lifting and placing into a vehicle. The travel cart also includes at least two wheels mounted to the rear bay in the preferred embodiment for easily traversing the cart. Rubber foot rests depend from the bottom of the cart's main bay for supporting the cart when it is stationary. In addition, a retractable handle extends from the cart, preferably the rear bay, for pulling the cart on its wheels. The handle has at least two positions extended and retracted. It may be extended for pulling the cart and retracted for conserving space.

In accordance with these and other objects which will become apparent hereinafter, the instant invention will now be described with particular reference to the accompanying drawings.

DESCRIPTION OF THE PREFERRED EMBODIMENTS

Figure 1:
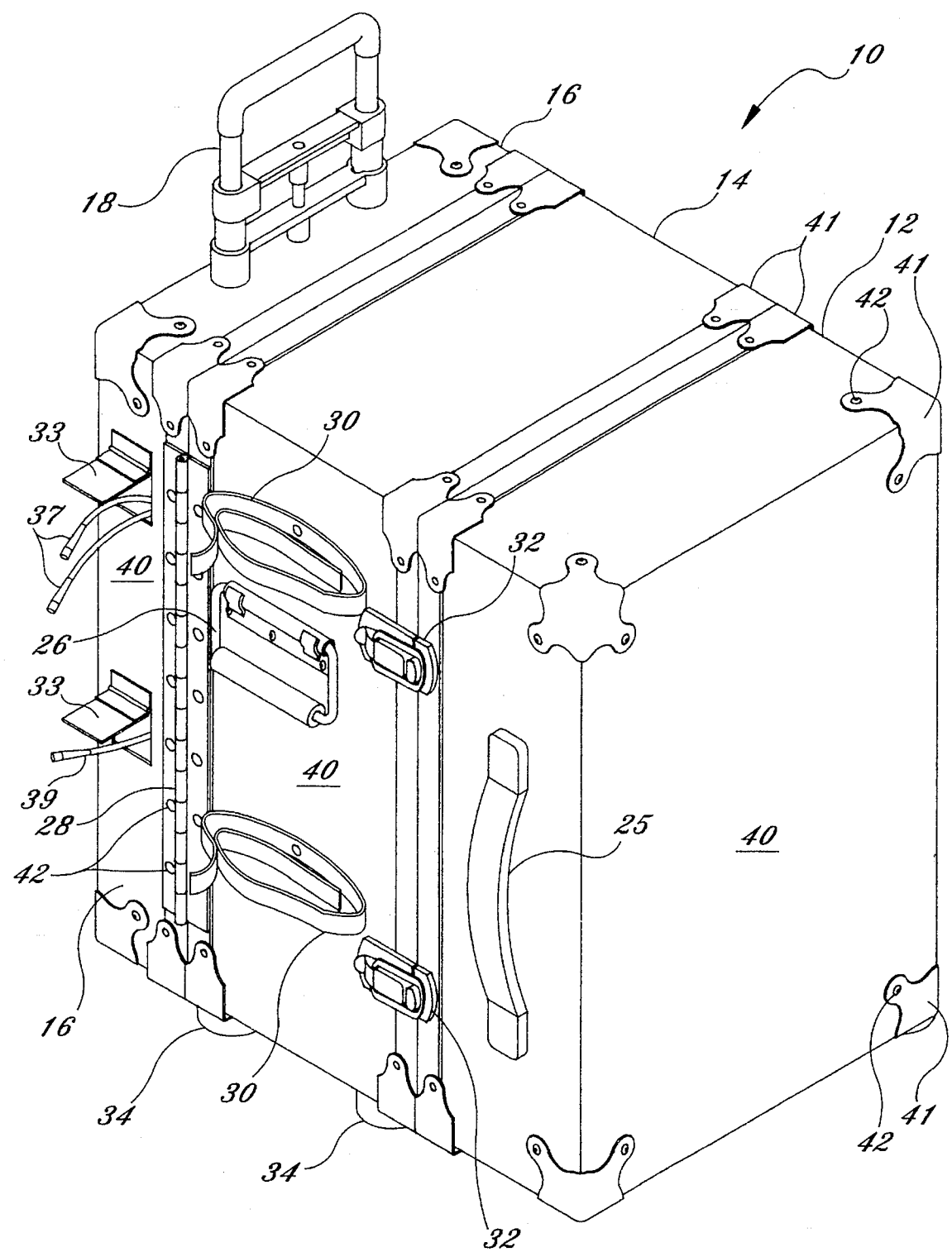
FIG. 1 is a front isometric view of the instant invention, illustrating the recording equipment travel cart and its three individual bays locked together in place.

With reference to the drawings, FIGS. 1–9 depict a video and audio recording equipment travel cart 10 generally comprising a segmented case having three distinct parts or compartments. The cart 10 typically comprises a front bay 12, a main bay 14, a back bay 16, a retractable handle 18, lift handles 24 and 26, wheel casters 34 and 36, a plurality of cable reels or spools 62, 64, 66, and mounting brackets and shelves. With reference to FIG. 1, the instant invention or travel cart 10 is shown in perspective, illustrating the front bay 12, the main bay 14, the back bay 16, and the handle 18 in the retracted position. As seen in FIG. 1, the front bay 12 has a closed front end and an open back end 12a. The open back end 12a is defined by a peripheral mating edge 22 that is connected to the open front end 14a of the main bay 12 along the mating edge 24 by fasteners 32. In the drawings, the fasteners 32 comprise buckle-type fasteners wherein a buckle latch 32a is affixed on one bay and a buckle engaging post 32b is affixed on the corresponding bay. Quick-release snaps or hook and loop straps, however, may be employed in the alternative.

Figure 2:
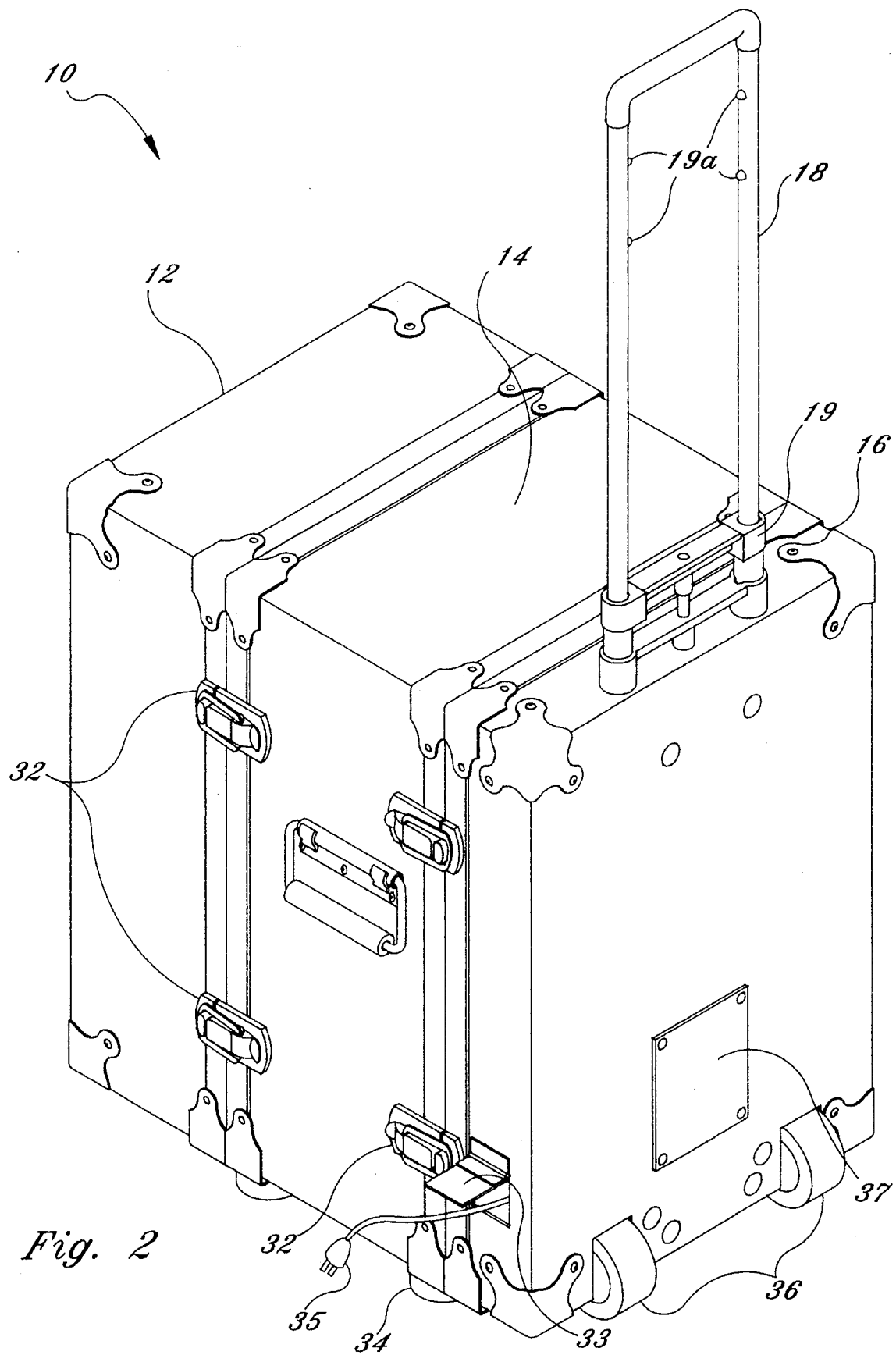
FIG. 2 is a rear isometric view of the instant invention, illustrating the handle in the extended position, the wheels attached to the lower end of the rear bay and the power cord, partially extending from the rear bay.
Figure 3:
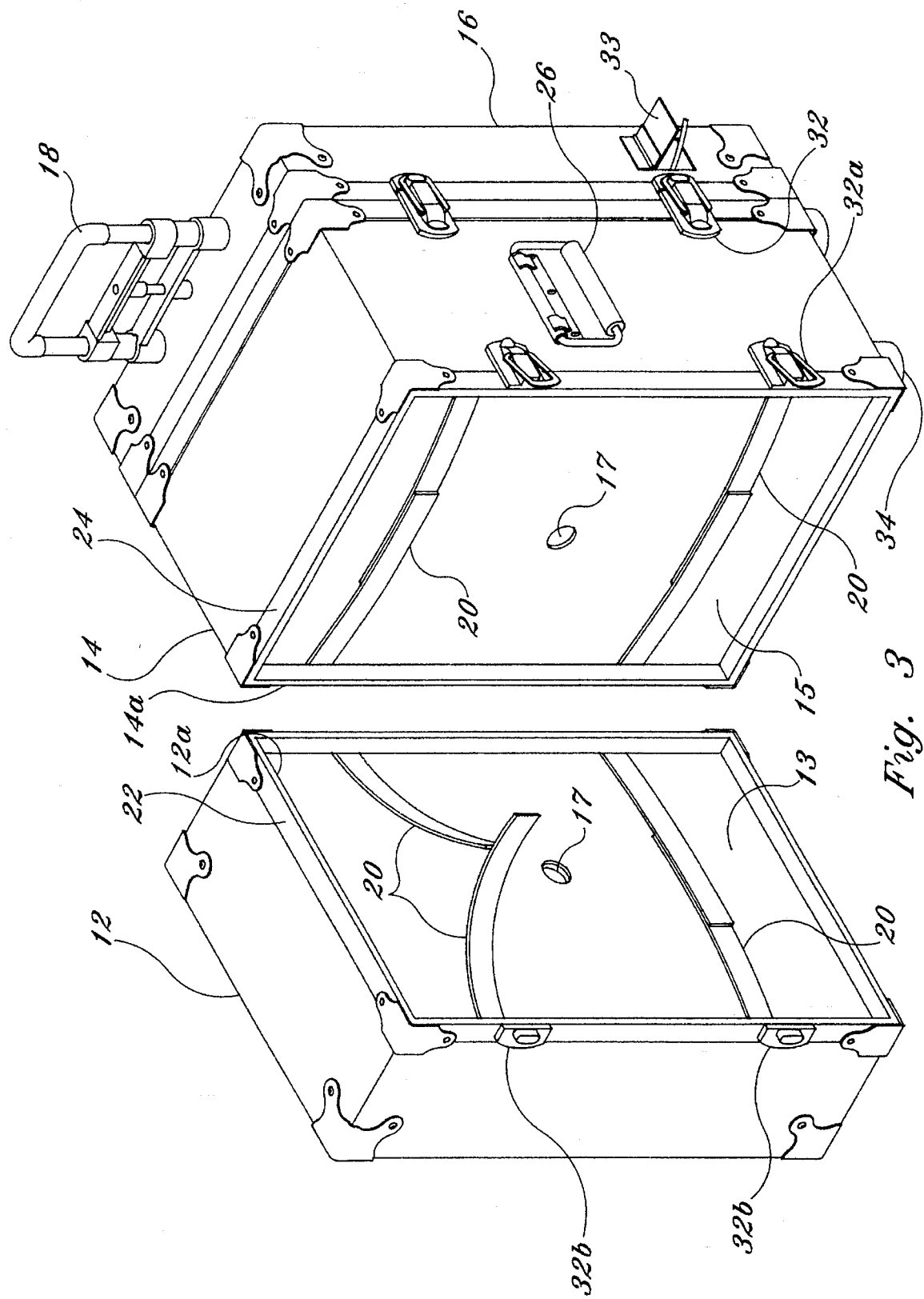
FIG. 3 is a partial exploded view of the instant invention, illustrating the front bay detached from the main bay, and illustrating the interior covers and their securing hook and loop straps.
Figure 8:
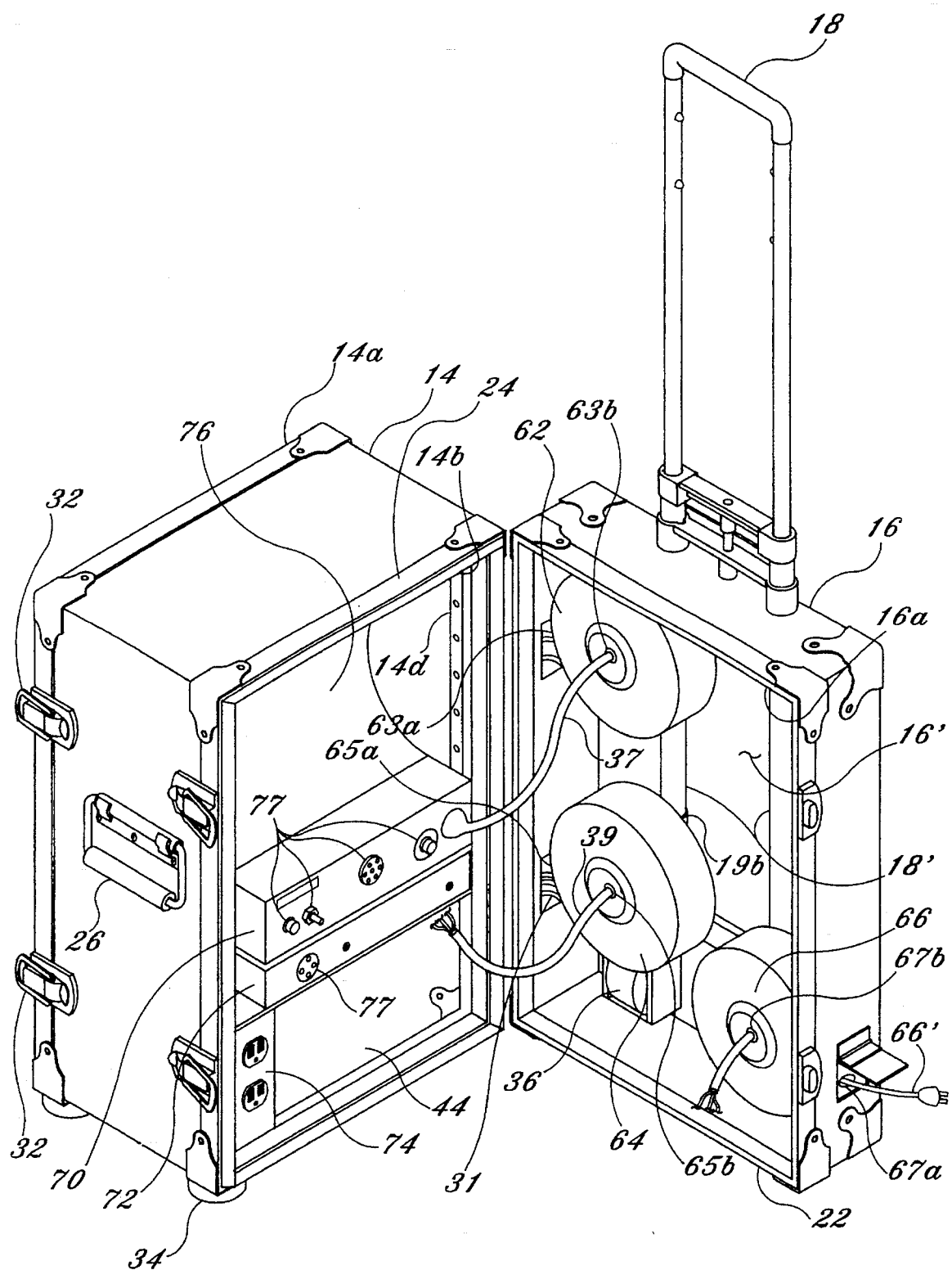
FIG. 8 is a rear isometric view of the rear bay and the main bay, illustrating the rear bay opened away from the main bay on its hinge.

The front bay 12 is completely detachable and removable from the main bay 14, as seen in FIG. 3, to facilitate easy and quick storage into closets or loading into the trunk of a car for transportation. With reference to FIGS. 1–3, a plurality of buckles 32 are fixedly attached to opposite sides of the case 10. The buckles are affixed proximal the open front end 14a of the main bay 14 and proximal the open back end 12a of the rear bay 12 which allows the front bay 12 to be releasably attached to and completely removed from the main bay 14. By contrast, the rear bay 16 only utilizes a plurality of buckles 32 attached on one side of the cart 10 while a piano hinge 28 is fixedly secured to the opposite side of the main bay 14 and the rear bay 16 so that the rear bay 16 may be swung open away from the main bay 14 while remaining attached along the one edge. As seen in FIG. 8, on one side the buckles 32 are affixed proximal the open front end 16a of the rear bay 16 and proximal the back end 14b of the main bay 14. Likewise, on the opposite side, the piano hinge 28 is affixed to the main bay 14 and the rear bay 16 proximal the back and front ends 14b, 16a, respectively, at each bay, as shown in FIG. 1. Thus, the front bay 12 is removable for making it easier to load the cart 10 into a trunk of a car, and the rear bay 16 remains attached to the main bay 14 by hinge 28 and buckles 32. The rear bay 16 remains attached to the main bay to maintain the cable connections running from the cable reels 62, 64 and 66 to the connection adapters 77 found on either the back of the equipment or on a panel in the rear portion of the main bay 14, as seen in FIG. 8 by way of example. Of course, the cables extending from the reels 62, 64 would branch out from the main cable grouping and connect to corresponding component adapters 77. The piano hinge 28 is preferably attached to the main bay 14 and rear bay 16 by hardware fasteners, such as rivets 42, screws or similar fasteners, while the buckles 32 may employ rivets, screws, or similar hardware fasteners or strong adhesives, such as epoxy. In addition, corner brackets 41 may be connected to the corners of each bay by adhesives or hardware such as rivets 42, screws, or the like to protect the edges from damage.

Figure 4:
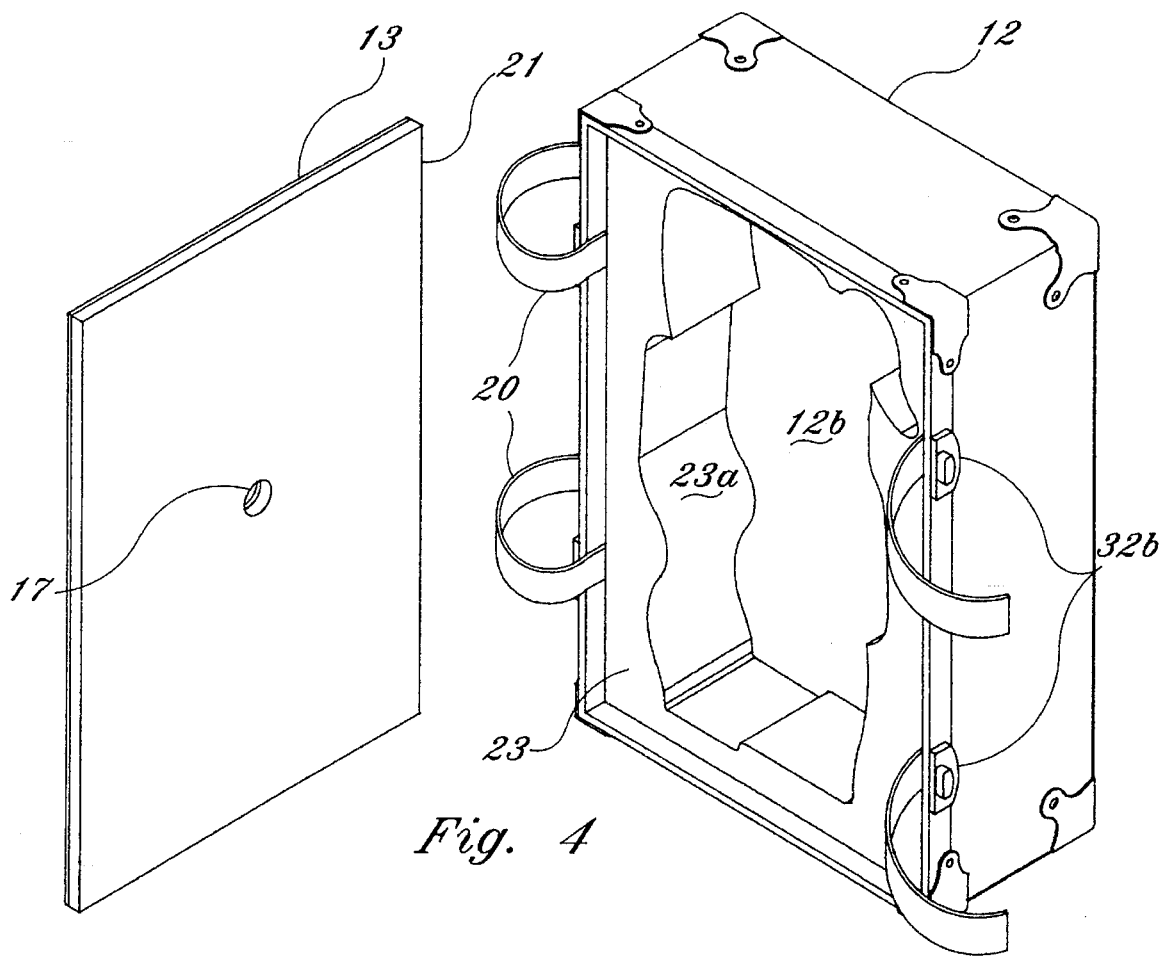
FIG. 4 is a partially exploded perspective view of the front bay interior volume and cover, illustrating the foam cushion cutout in the front bay and the foam cushion lining on the cover.

The video camera 80 or camcorder is typically stored in the interior volume 12b defined by the front bay 12. As shown by FIG. 4, a foam cushion lines the interior volume 12a and forms a cutout corresponding to the shape of a typical video camera. This cutout may be made to snugly fit any size camera. In addition to absorbing shock so as to protect the camera, the cushion lining prevents the camera from sliding inside the front bay compartment 12. Both the front and main bays 12, 14 contain an enclosure cover 13, 15, respectively, which closes off, seals, secures, and protects the components contained within their respective enclosures. This is especially necessary when the front bay 12 is joined or attached to the main bay 14. That is, without the covers, the camera 80 would knock against the rack equipment contained in the main bay 14, potentially causing damage. The closure panels 13, 15 are secured in place on their respective bays by at least one pair of hook and loop straps 20, but preferably two. The interior portions of the covers 13, 15 are also lined with a foam cushion liner 21 to protect the components contained in the bays 12, 14. An aperture 17 is defined by each cover 13, 15 so that the covers may be removed. The foam cushion lining 23 inside the front bay 12 is slightly recessed from the front end 12a so that the cover 13 may fit within the confines of the interior walls of the front bay 12. Likewise, the equipment inside the main bay is slightly recessed from the front edge 14a of the main bay 14 so that the main bay cover 15 may rest inside the interior walls of the main bay 14.

Figure 5:
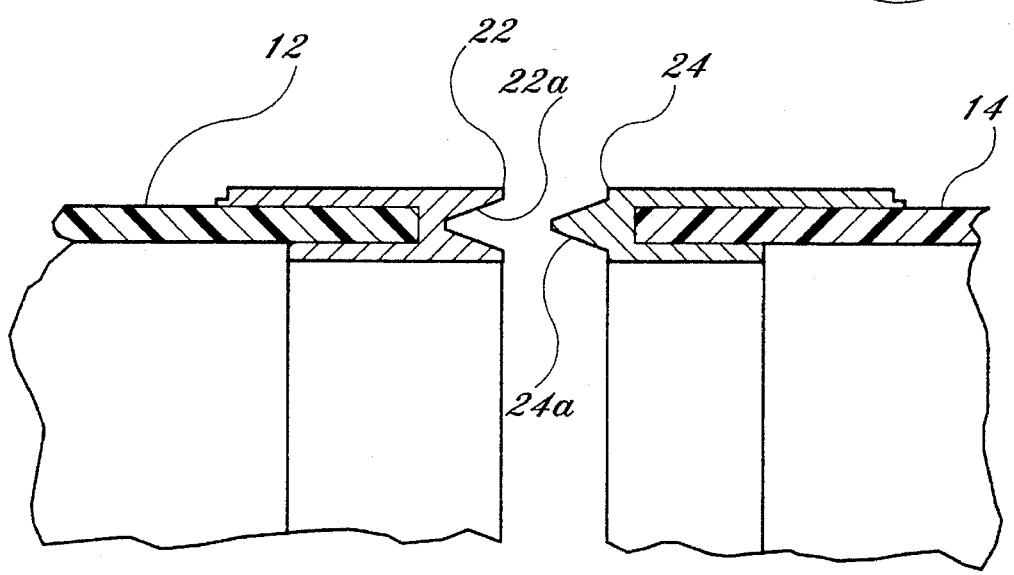
FIG. 5 is a partial cut away cross sectional view of the opened end mating edges used to connect the front bay to the main bay and the rear bay to the main bay, illustrating the tongue and groove connecting feature.

The mating edges 22, 24 defined by the front bay 12 and the main bay 14, respectively, interlock by way of tongue 24a and groove 22a when the front bay is attached to the main bay. With reference to FIG. 5, the front bay 12 may define a groove 22a along its peripheral mating edge 22 at the open back end 12a for mating with a corresponding tongue 24a protruding or defined by the main bay's open front end 14a. The main bay front end 14a defines a peripheral mating edge 24 corresponding to the front bay's mating edge 22. Obviously, the main bay 14 may define the groove while the front bay 12 may define the corresponding tongue without departing from the scope and spirit of the instant invention. The tongue and groove attachment of the front bay 12 to the main bay 14 helps to secure and seal the compartments for a snug and substantially watertight fit. Likewise, the main bay 14 and rear bay 16 utilize the tongue and groove mating fit with mating edges 24 and 22, respectively, for the same snug and watertight fit.

With reference to FIG. 2, wheels 36 are found rotatably connected to or within channels on the back of rear bay 16 so that the cart 10 may be easily pulled along to its destination. A plurality of rubber feet 34 depend from the bottom side of the main bay 14 for supporting the cart 10 in a level position when the cart is at rest. The rubber feet 34 are secured to the bottom edge of the main bay 14 by fasteners, such as screws, and may also be attached the bottom side of the other bays. As shown by the Figures, the peripheral tongue 24a and groove 22a edges may be secured to the main body 40 of the travel cart 10 by way of securing brackets 41. The securing brackets 41 and the tongue and groove edges 24a, 22a contain corresponding apertures which receive rivets 42 or similar fasteners to permanently join the fastening edges to the main body 40.

Figure 6:
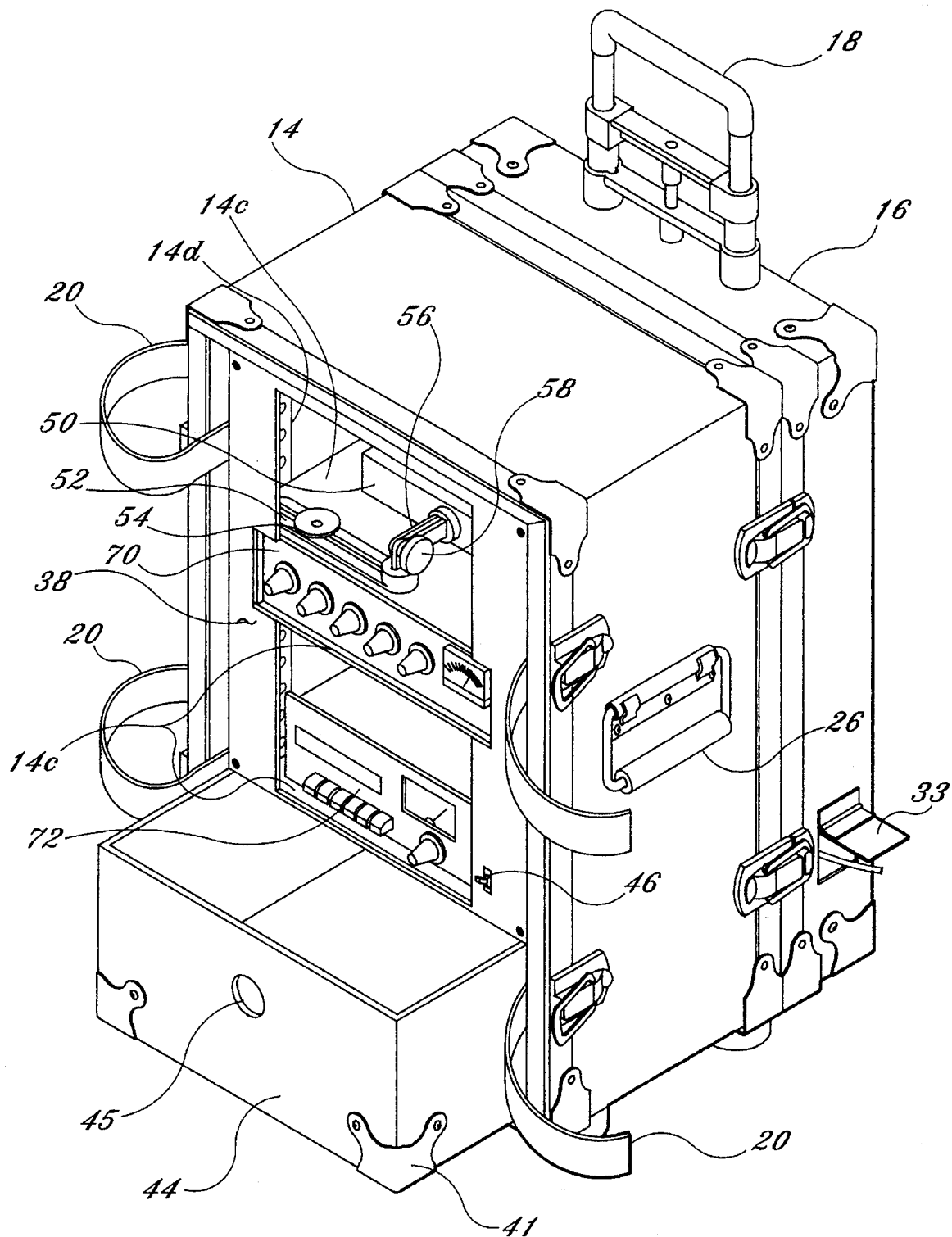
FIG. 6 is a front isometric view of the main bay and rear bay of the instant invention, illustrating the rear bay connected to the main bay, the components contained within the main bay, and the lower drawer partially opened.
Figure 7:
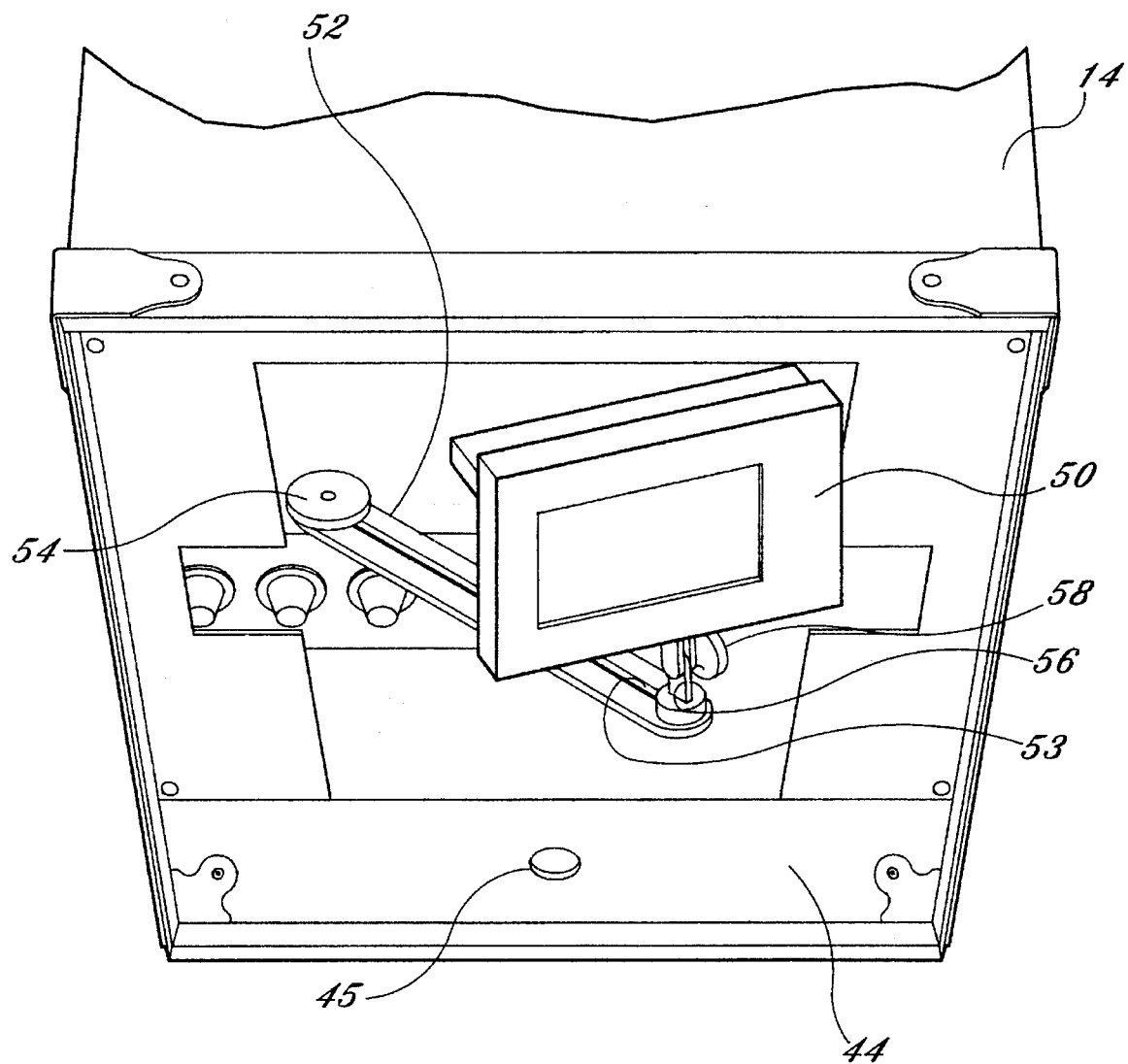
FIG. 7 is a front perspective partial view of the main bay taken from the top of the main bay, illustrating the video camera extended outside the main bay volume.

The main bay 14 may be used to store equipment such as a cassette player 72, a multi-channel audio mixer 70, and an LCD monitor 50 or its equivalent. The equipment is rack-mounted onto shelves 14c and may be secured in place by brackets, such as brackets 14d, or secured by corresponding hook and loop strips. The interior walls of the main bay 14 may contain securing brackets 14d with a plurality of apertures for receiving fasteners and mounting the shelves 14c. Corresponding brackets may be used to attach to a component at one end and at the other end to the main bay brackets by way of fasteners such as nuts and bolts for additional security. Accordingly, by resting the components on the shelves and securing them in place by either securing brackets or hook and loop, the components are prevented from shifting. The main bay 14 also offers a unique feature in that the video monitor, as shown in FIG. 7, may be safely stored within the main bay volume when not in use and pulled out and supported outside the main bay 14 when needed. A support bar 52 having a bolt-engaging groove 53 defined longitudinally along the support arm 52 enables the video monitor 50 to be slidably removed from the interior volume of the main bay 14. The support arm 52 is secured to its corresponding shelf 14c by a thumbscrew fastener 54 which intersects the groove and mates with a corresponding fastener found on the shelf. At one end of the support arm 52, the video monitor 50 is joined to the support arm 52 by a pivot arm 56 as shown in FIGS. 6 and 7. The pivot arm 56 allows the video monitor to be tilted in any direction. As with the support arm 52, the pivot arm 56 may be adjusted by loosening a thumbscrew 58 to allow tilting the video screen 50, and once again tightening the thumbscrew 58 to secure the video screen 50 in one position. In addition to the video monitor 50, FIG. 6 illustrates an audio mixer 70 for controlling the sound quality and a front-loading cassette player 72 for audio recording and sound level adjustments. At the lower end of the main bay 14, a drawer 44 may be provided for storing any additional equipment which may be required at the recording location. An aperture 45 is defined by the front side of the slidable compartment 44 for pulling the drawer 44 open. The drawer slidably engages the lower portion of the main bay 44.

The rear bay open front end 16a is connected to the open back end 14b of the main bay 14 by a piano hinge 28 on one side and releasable buckles 32 on the opposite side, as shown in FIGS. 1, 2, and 8. The piano hinge 28 may be secured to corresponding side edges on the back bay 16 and the main bay 14 by rivet fasteners 41 or similar hardware. On the opposite side, the rear bay 16 is joined to the main bay 14 by the buckles 32 which releasably lock or join the rear bay 16 to the main bay 14. By releasing the buckles 32, the rear bay may be opened away from the main bay by swinging on the piano hinge 28. Swinging the rear bay 16 open allows the necessary connections between the cables 66', 37 and 39 and the component adapters 77 to be made.

The open back end 14b of the main bay 14 may also be defined by a tongue mating edge 24 while the open front end 16a of rear bay 16 may include the groove mating edge 22. Of course, the mating edges 24, 22 may be reversed on the bays 14, 16.

With reference to FIG. 8, the interior volume 16' of rear bay 16 may contain three cable reels 62, 64 and 66. The reels 62, 64 and 66 may be permanently affixed to either the back wall of the rear bay 16 or to the handle sleeves 18' by way of fastening brackets 19b and fasteners, such as screws, nuts or bolts. The reels 62, 64, and 66 house the cables which are necessary for interfacing the camcorder with the video monitor and audio mixer, the microphones with the audio mixer and tape recorder, and the power cable to a common power strip for supplying power to all the components.

The cable reels 62, 64 and 66 may be cylindrical housing enclosures having spring-loaded spools that retract the cables back into the spool housing automatically when the cables are released from their locked position. Accordingly, when the cables are extended, they are able to be locked into a desired position length and then released automatically back onto the spools for storage purposes. The tension created inside the spring-loaded mechanism of the cable reels when the cables are extended force the spool to spin back into its relaxed position, thereby causing the cables to be automatically retracted.

The reel housings typically contain two openings. The first of the openings 67a, 65a and 63a are aligned with ports 31 defined by the sides of the rear bay 16 so that the cables 35, 37 and 39 may be extended outside the case 10. The other opening 63b, 65b and 67b allow the opposite ends of the cables to interface with their respective mating adapters. The apertures 63b, 65b and 67b may be located near the center of the reels 62, 64, 66, respectively, so the cables feed through more easily for connecting to the components' adapters 77. In the preferred embodiment, the first and second reels 62 and 64 contain the plurality of video recorder cables 37 and microphone cables 39, respectively. Both the first and second reels may be aligned on one side of the rear bay so that the cables extend from the same side of the rear bay. At the lower end of the rear bay, the third cable reel 66 houses the power cord 66 which extends out the opposite side of the rear bay 16. All three ports 31 have hinged doors 33 which close off the ports when the cables are not in use. The doors 33 may have a hook loop strip secured to its underside for attaching to corresponding hook and loop strips in the rear bay walls.

The power strip 74 provides a plurality of outlets which the recording components plug into for their power source. If the connection panel is used in the alternative it provides a plurality of adapters which are preferably all unique for mating with their respective cable plugs. A connection panel is not necessary, but merely an alternative structure for interfacing the cables with their respective components. The cables may be plugged or hardwired directly to the components. A concave plate 76 is also found in the main bay 14 to separate the equipment from the cables while providing an enclosure or space for resting the cables when the rear bay is closed and locked to the main bay 14.

On the exterior portions of the travel cart 40, additional straps 30 are provided for securing whatever additional accessories are needed. In addition, the front bay 12 maintains strap handles 25 which are used to lift the front bay 12. The retractable handle 18 may be locked in at least two positions, whereby it has corresponding retractable locking buttons 19a spatially aligned for locking the handle into its respective positions as seen in FIG. 2. A release bar 19 slides along the handle 18 to engage the releasable buttons 19a for adjusting the handle. Additional handles 24 and 26, shown in FIGS. 1 and 2, may be pivotally attached to the sides of the main bay 14, as well as to the other bays, to assist in lifting the cart into a vehicle or closet. When storing the cart 10, the handle 18 may be retracted into the rear bay 16 to conserve space.

The travel cart is preferably made of a lightweight plastic 40 to protect the equipment contained therein and which may weigh approximately 40 pounds. Meanwhile, the equipment inside the main bay 14 is still protected by the foam insulation lining the interior walls. Note that all equipment is maintained safely inside the travel cart 10 so that only one piece, that being the travel cart 10, is required to be transported and moved to various sites. Additional securing may be provided by hook and loop straps, such as that known under the trademark Velcro®, and by additional bolts, brackets, and hardware. A back plate 37 is found on the rear bay 16 exterior back wall and is utilized as a kick-plate for achieving leverage in pulling the cart 10 back onto its wheels 36 for movement.

It is preferred that the equipment remain secure and contained within the volume of the main bay 14 and that the front bay 12 should be used for housing the video camera and be detachable from the main bay 14 to facilitate easier, more convenient travel. It has been found that by containing all the equipment in one convenient case, setup time may be reduced to five minutes. This has been achieved by the cart which allows all the wiring to be done beforehand, so that only the cables for the power and video camera need to be connected.

Figure 9:
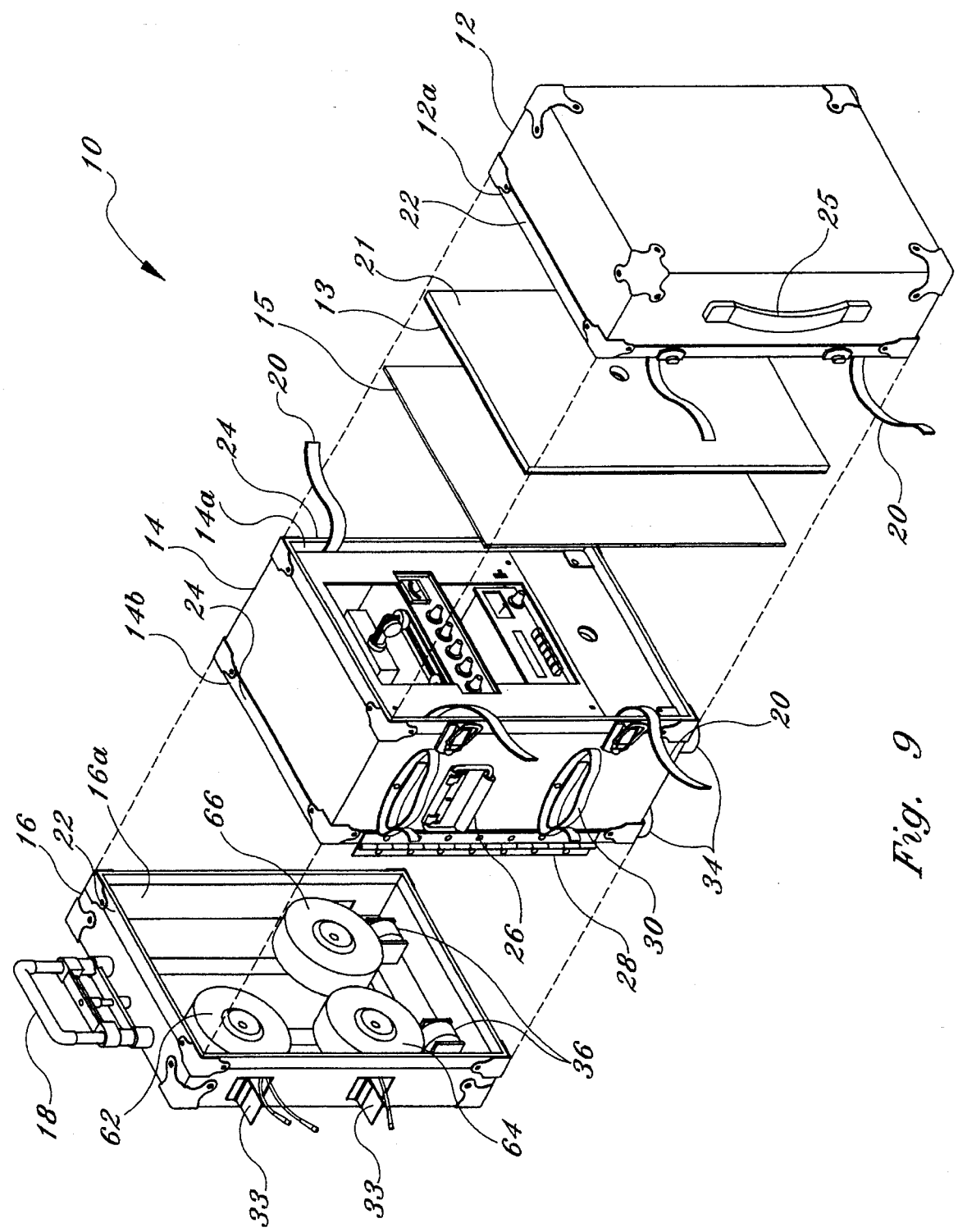
FIG. 9 is an exploded isometric view of the preferred embodiment of the recording equipment travel cart illustrating the three individual bays and covers.

With reference to FIG. 9, an exploded isometric view illustrates the segmented individual bays 12, 14, and 16 and the covers in an alignment which facilitates connection. From the figure it can be seen that the cart comprises three main compartments 12, 14 and 16 for storing selected equipment. Typically, the rear bay 16 is permanently connected to the main bay 14 by the piano hinge 28. The front bay 12, however, is intended to be completely detachable, as shown, for more convenient storage. The covers 15, 13 protect the components inside the main bay 14 and front bay 12, respectively, when the bays are connected or separated. FIG. 9 also illustrates the reels 62, 64, 66, casters 36, rubber feet 34, handles 25, 26, and straps 20, 30.

Figure 10:
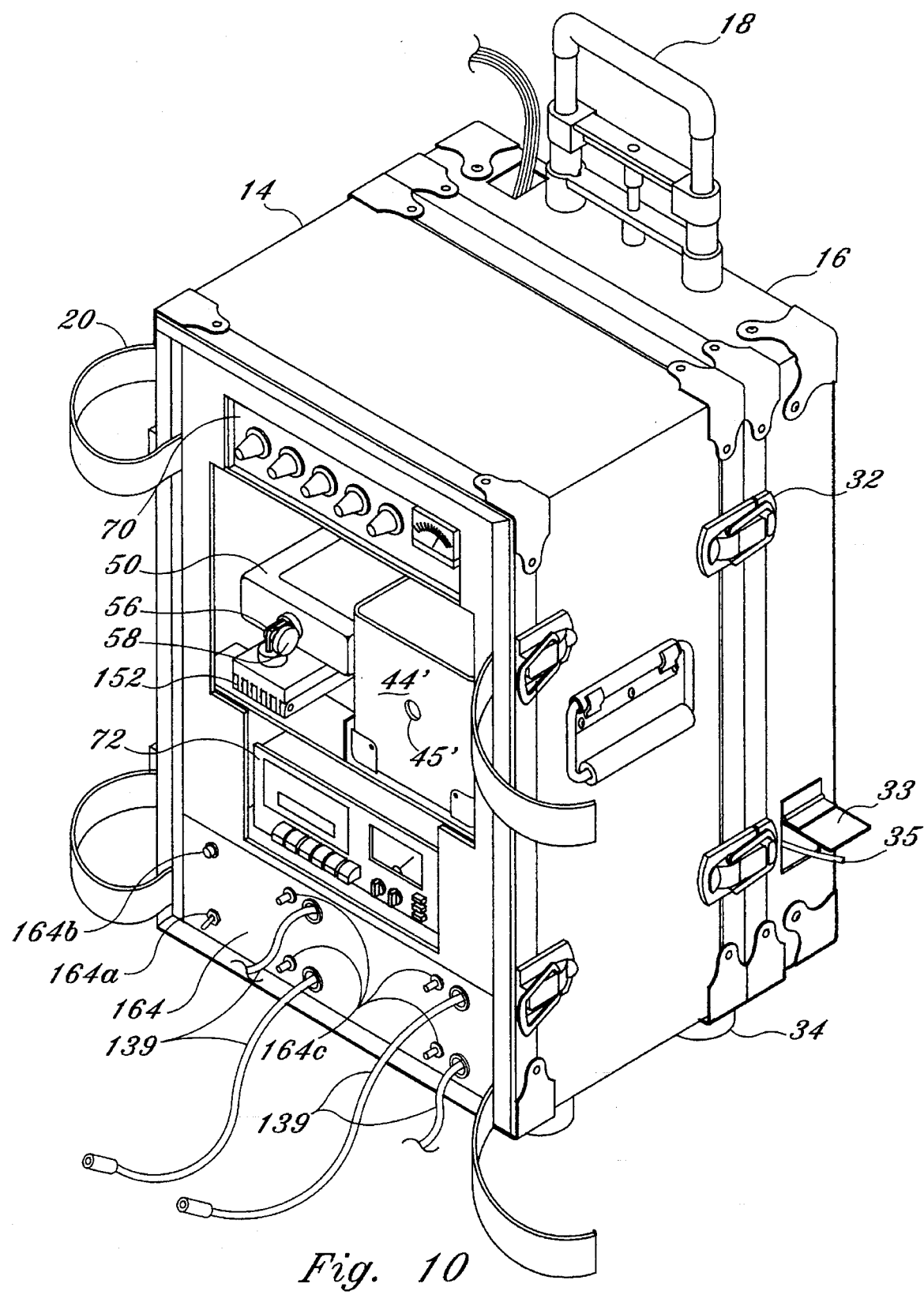
FIG. 10 is a front isometric view of an alternative embodiment of the instant invention.
Figure 11:
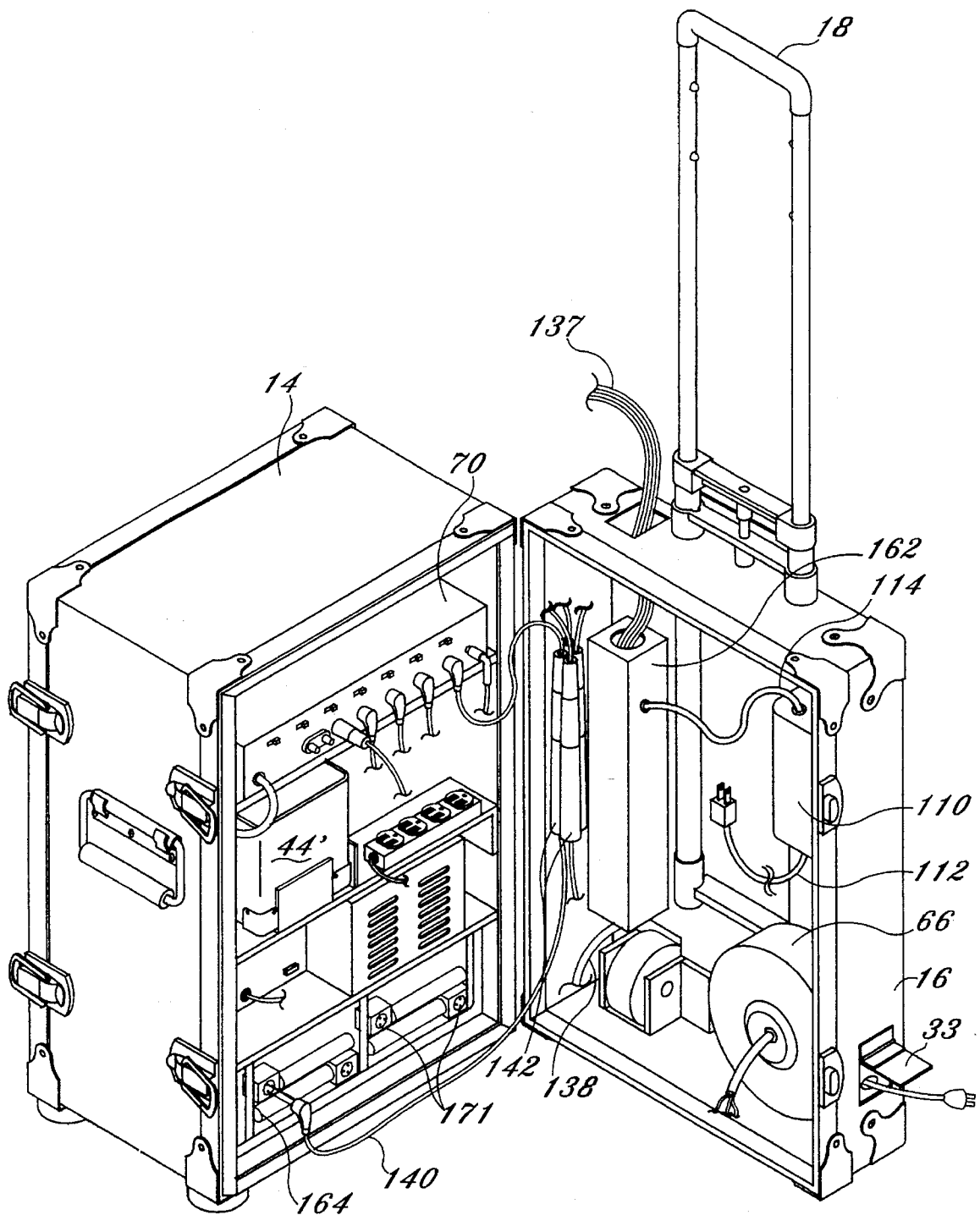
FIG. 11 is a rear isometric view of the alternative embodiment of the instant invention.
Figure 12:
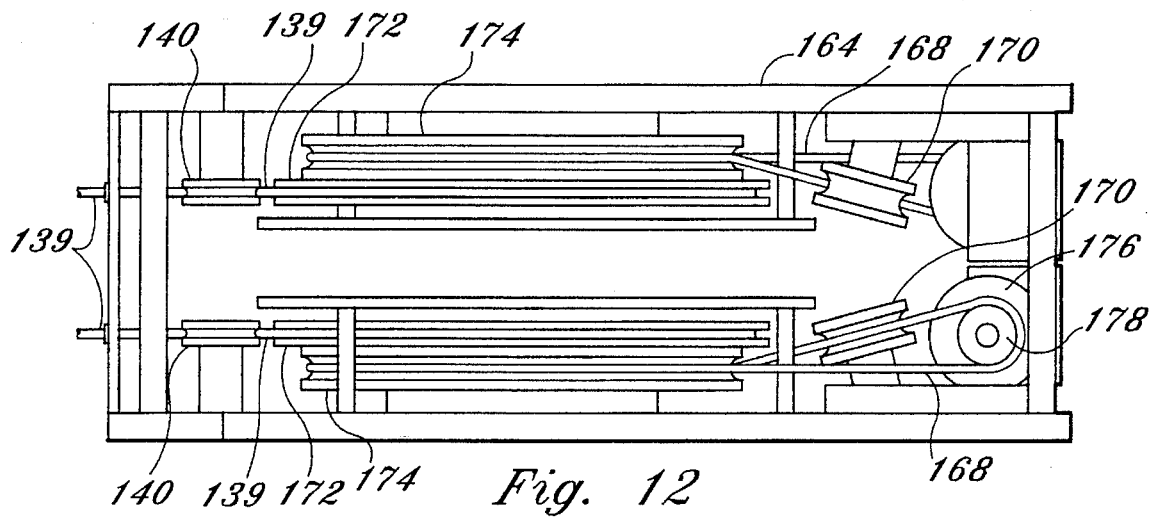
FIG. 12 is a side elevational view of the alternative automatic microphone cable reel without a side panel attached.
Figure 13:
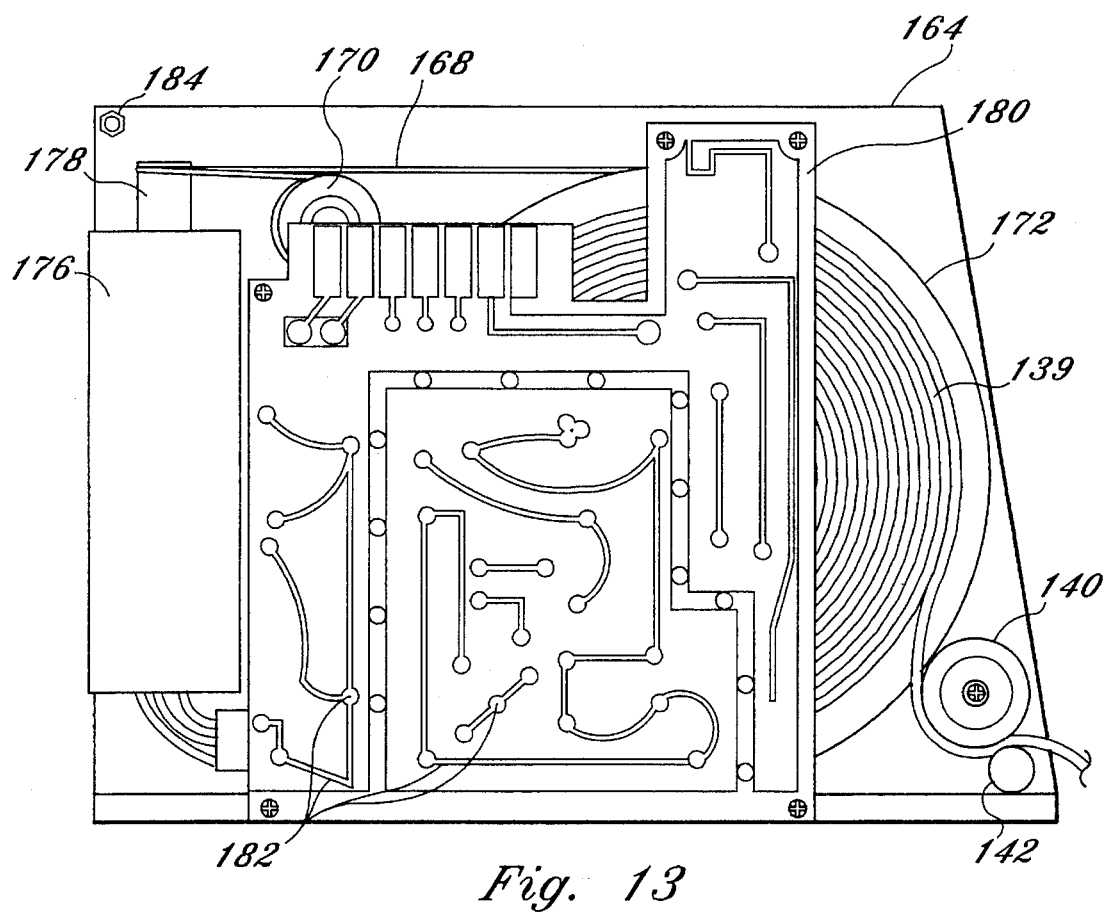
FIG. 13 is a top plan view of the alternative embodiment of the automatic microphone cable reel with a protection panel removed.
Figure 14:
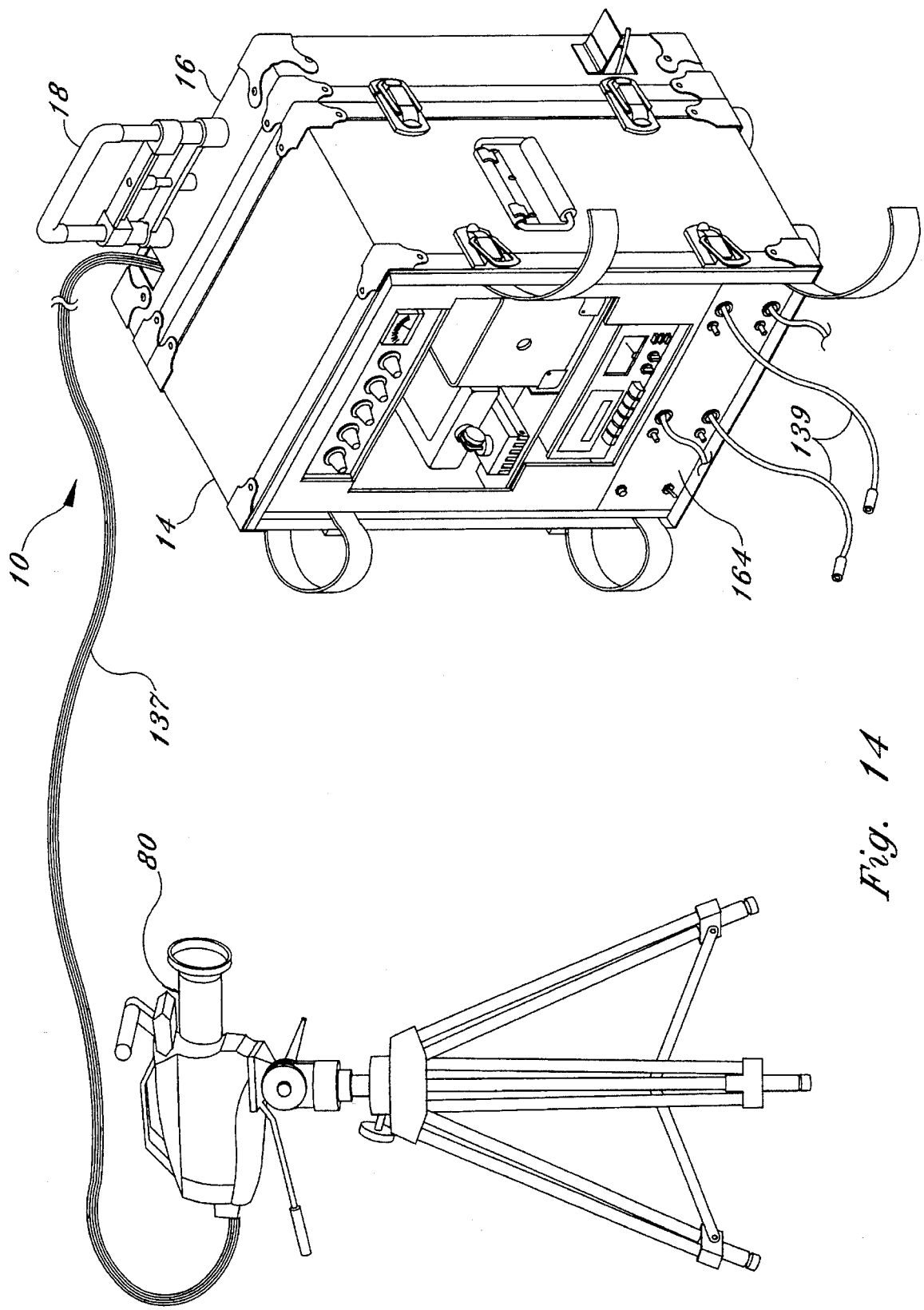
FIG. 14 is a front isometric view of the alternative embodiment of the instant invention illustrating the video camera removed from the front bay and electrically joined to the cart.

With reference to FIGS. 10–14, an alternative embodiment of the instant invention is shown, whereby the spring-loaded reel 64 for the microphone cables 139 may be replaced by an electrical microphone cable reel system 164. The electrical microphone cable reel system 164 includes a plurality of electrically propelled spools 172 for automatically extending and retracting a plurality of microphones and microphone cables. There may be four microphones and cables for setting up in all corners of a room. As shown in FIGS. 12 and 13, each electric spool is spun by a motor 176 and motor shaft 178 which is controlled by a signal conditioning board 180 having soldered connections 182. In the alternative, the signal conditioning board may also amplify signals. As shown, the board 180 is typically secured by hardware 184, such as bolts. The microphone cable reel 172 is mechanically spun by a belt 168 which wraps around the motor shaft 178 and pulleys 170 and 174. Meanwhile, the microphone cable 139 is guided out the reeling system 164 by pulleys 140 and 142. The reel system 164 also includes a power switch 164a, and LED power indicator 164b or other light source, and switches 164c which may include integral light indicators. As seen in FIGS. 10, 11, and 14, the electrical microphone cable reel 164 is preferably installed at the lower end of the main bay 14 so that the microphones 139 extend out the front. In such a setup, the storage bin 44' is smaller, has a pulling aperture 45', and is on one side of a central shelf next to the video monitor 50 while the audio mixer 70 is on the top shelf and the tape recorder 72 near the bottom above the reel system 164.

The alternative embodiment of the invention may also provide a different housing 162 for the video camera ribbon cable 137. The alternative housing for the video camera cable may comprise a somewhat elongated tube, either rectangular or cylindrical affixed to the interior rear bay in the same manner as the previous reel 62. This alternative housing 162 provides for a ribbon cable 137 whereby all the video camera cables are aligned and terminated by a single plug which conveniently connects to a corresponding adapter on the video camera as shown in FIG. 14. The other end of the ribbon cable 137 may be defined by a cable 138 extending out from the bottom of housing 162 for connecting to the equipment in main bay 14, such as the monitor 50. Also shown in the alternative embodiment is an AC adapter 110. The AC adapter 110 provides an AC to DC conversion for components which require DC power and has an extension extending into housing 162. The cable reel system 164, in the alternative embodiment, requires connection leads 140 for interfacing adapters 171 with the audio mixer 70. These leads 140 are guided and secured by sleeves 142.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A video and audio recording equipment storage and travel cart for supporting and moving video and audio recording equipment, including a plurality of cables, video and audio control components, and a video camera, conveniently between locations, said cart comprising:

a main bay, vertically oriented, said main bay for storing the video and audio control components, said main bay defining an open front end and an open back end;

means for securely mounting the video and audio control components in said main bay so that the control components remain substantially stationery when said cart is moved, said mounting means fixedly secured within said main bay;

a rear bay for storing the plurality of cables so as to facilitate connection with the video and audio recording equipment, said rear bay hingedly attached along a first edge to said main bay;

a front bay, for storing a video camera, releasably attached to said main bay;

wheel means, rotatably attached to said cart, for traversing said cart along the ground; and handle means, retractably attached to said cart, for pulling said cart.

2. A cart as recited in claim 1, further comprising:

means for releasably fastening a second edge of said rear bay to said main bay, said second edge oppositely disposed the second edge.

3. A cart as recited in claim 2, further comprising:

means for releasably fastening said front bay to said main bay, said releasably fastening means partially attached to said main bay, and partially attached to said front bay.

4. A cart as recited in claim 3, further comprising rubber foot stops depending from a bottom end of said main bay to balance and support said cart.

5. A video and audio recording equipment storage and travel cart for supporting and moving video and audio recording equipment, including a plurality of cables, video and audio control components, and a video camera, conveniently between locations, said cart comprising:

a main bay, vertically oriented, said main bay for storing the video and audio control components, said main bay defining an open front end and an open back end;

means for securely mounting the video and audio control components in said main bay so that the video and audio control components remain substantially stationary when said cart is moved, said mounting means fixedly secured within said main bay;

a rear bay, vertically oriented, for storing the plurality of cables, said rear bay defining a closed back end and an open front end, said rear bay open front end being contiguous with said main bay open back end so that the cables may be directly connected to the video and audio control components;

means hingedly joining a first side edge defined by said rear bay with a corresponding first side edge defined by said main bay for swinging said rear bay open;

means for releasably fastening a second side edge defined by said rear bay, opposite said first side edge, to a second corresponding edge defined by said main bay, opposite said first corresponding edge, said releasable fastening means partially attached to said main bay and partially attached to said rear bay;

a front bay, vertically oriented, for storing the video camera, inside an inner volume said front bay defining an open back end and a closed front end, said front bay open back end being contiguous with said main bay open front end when attached to said main bay, said front bay being releasably attached to said main bay;

means for releasably fastening said main bay to said front bay, said releasably fastening means partially attached to said main bay and partially attached to said front bay; and wheel means rotatably attached to said rear bay for easily traversing said cart.

6. An apparatus as recited in claim 5 further comprising a handle means retractably attached to said rear bay for pulling said cart.

7. An apparatus as recited in claim 5, further comprising:

a plurality of cable collecting means affixed in said cart for collecting the cables into select groups to categorically store the cable groups so that the cable groups may be selectively separated.

8. A cart as recited in claim 7, wherein said plurality of cable collecting means comprises:

at least one reel affixed inside said rear bay, said reel having a rotation means disposed within said reel for collecting select cables into said reel when said rotation means turns;

means for locking the select cables in place when the select cables are extended to a desired length, said cable locking means operatively associated with said rotation means; and means for automatically retracting the select cables previously extended back into said at least one reel, said automatic retracting means operatively associated with said rotation means.

9. A cart as recited in claim 5, further comprising:

an electrically operated cable reeling means disposed in said cart for automatically extending the cables for use and for automatically retracting the cables back into said electrically operated cable reeling means for storage.

10. A cart as recited in claim 9, said electrically operated cable reeling means being disposed in said main bay, said electrically operated cable means having a plurality of spools for categorically collecting the cables.

11. A cart as recited in claim 7, wherein said plurality of cable collecting means comprises:

an electrically operated cable reeling means for automatically extending and retracting cables, said electrically operated cable means having a plurality of spools;

at least one mechanical reel for collecting cables secured in said electrical reeling means, said at least one mechanical reel having means for locking cables in place when extended to a desired length and a means for rotatably retracting cables automatically when said means for locking is unlocked; and means for housing cables attachable to a video camera.

12. A cart as recited in claim 5, further comprising a foam cushion liner volume the inner lining of said front bay for absorbing impact so as to protect the video camera stored therein from damage.

13. A cart as recited in claim 12, wherein said foam cushion lining defines a cut out that conforms to the shape of the video camera stored therein.

14. A cart as recited in claim 12, further comprising:

at least one cover situated between said front bay and said main bay when said front bay is attached to said main bay so as to prevent the video camera stored in said front bay from contacting components stored in said main bay; and at least one strap, secured to said front bay, having a fastening means for for securing an end of said at least one strap so as to secure said at least one cover over said front bay open back end.

15. A cart as recited in claim 5, further comprising:

a panel closing off at least a portion of said main bay open back end so as to protect components in said main bay; and a plurality of cable adapters mounted to said panel for electrically interfacing cables in said rear bay to components in said main bay.

16. A cart as recited in claim 11, further comprising means for supplying power to components mounted in said main bay, said power supplying means affixed inside said main bay.

17. A cart as recited in claim 7, wherein said means for securely mounting video and audio control components in said main bay comprise a plurality of shelves and a plurality of brackets having a plurality of apertures for supporting said shelves and for supplying a support means to support said components.

18. A cart as recited in claim 5, wherein said means for releasably fastening comprises a buckle and a buckle engaging tab, wherein said buckle engages said tab when fastening.

19. A video and audio recording equipment storage and traveling cart for supporting and moving recording equipment conveniently between locations, said cart comprising:

a main bay, vertically oriented, said main bay for storing video and audio control components, said main bay defining an open front end and an open back end;

a plurality of brackets fixably secured within said main bay;

a plurality of shelves mounted in said main bay and supported by said plurality of brackets, said shelves and said brackets for supporting video and audio components;

a means for securing said components to said brackets;

a rear bay, vertically oriented for storing a plurality of cables used to interface video and audio control components with video cameras and microphones, said rear bay defining a closed back end and an open front end, said rear bay open front end being contiguous with said main bay open back end so that the cables may be directly connected to the video and audio control component;

a means for hingedly joining a first side edge defined by said rear bay with a first common side edge defined by said main bay so that said rear bay swings open away from said main bay;

a front bay, vertically oriented, for storing a video camera in side an inner volume defined by said front bay, said front bay defining an open back end and a closed front end, said front bay open back end being contiguous with said main bay open front end, said front bay releasably attached to said main bay;

means for releasably fastening a second side edge defined by said rear bay to a corresponding second edge defined by said main bay, said means for releasably fastening secured to said rear bay and said main bay;

means for releasably fastening said front bay to said main bay so as to conceal said main bay open front end, said means for releasably fastening said front bay to said main bay being partially connected to said main bay and partially attached to said front bay;

wheel means rotatably attached to said rear bay for easily traversing said cart;

at least one spring-loaded reel having a rotation means disposed within said reel for collecting cables into said reel when said rotation means turns, said spring loaded reel also for automatically retracting cables previously extended from said reel back into said reel, said automatic retracting means being operatively associated with said rotation means;

a foam cushion lining the inner volume of said front bay for absorbing impact so as to protect a video camera stored therein from damage;

means for electrically reeling microphone cables disposed in said cart, said means for electrically reeling microphone cables automatically extending and retracting microphone cables; and means for supplying power to components mounted in said main bay, said power supply means disposed inside said cart.

* * * * *